(12) United States Patent
Joo

(10) Patent No.: US 6,435,051 B1
(45) Date of Patent: Aug. 20, 2002

(54) DRIVING CAM OF GENEVA MECHANISM

(76) Inventor: Sang Wan Joo, Shindorim Dong-a Apt 108-502, 643, Shindorim-dong, Guro-gu, Seoul (KR)

( * ) Notice: Subject to any disclaimer, the term of this patent is extended or adjusted under 35 U.S.C. 154(b) by 0 days.

(21) Appl. No.: 09/574,169

(22) Filed: May 18, 2000

(30) Foreign Application Priority Data

May 20, 1999 (JP) .......................................... 11-140444

(51) Int. Cl.$^7$ .............................................. F16H 55/17
(52) U.S. Cl. .............................. 74/436; 74/820; 384/45
(58) Field of Search ..................... 74/436, 820; 384/43, 384/45

(56) References Cited

U.S. PATENT DOCUMENTS

| | | | | |
|---|---|---|---|---|
| 5,439,294 A | * | 8/1995 | Rixen ........................... | 384/45 |
| 5,640,768 A | * | 6/1997 | Teramachi ............... | 29/898.03 |
| 5,906,134 A | * | 5/1999 | Yamada ....................... | 74/436 |
| 6,234,047 B1 | * | 5/2001 | Yamada ....................... | 74/820 |

FOREIGN PATENT DOCUMENTS

GB         2047839 A     * 12/1980

* cited by examiner

*Primary Examiner*—David Fenstermacher
(74) *Attorney, Agent, or Firm*—Sheridan Ross PC

(57) ABSTRACT

A driving cam of a Geneva mechanism includes a core member coupled to the driving cam, and including a circular arcuate portion to correspond to a circular arcuate concave of a driven cam and a groove formed along a peripheral surface of the circular arcuate portion; a plurality of rotating bodies arranged in the groove; top and bottom covers including rims formed at a location corresponding to the groove to be protruded to face each other, the rims having a gap therebetween and preventing the rotating bodies from being removed from the groove when the top bottom covers are coupled to the driving cam and contact upper and lower surface of the core member, respectively; and a coupling means for coupling the core member and the top and bottom covers.

9 Claims, 5 Drawing Sheets

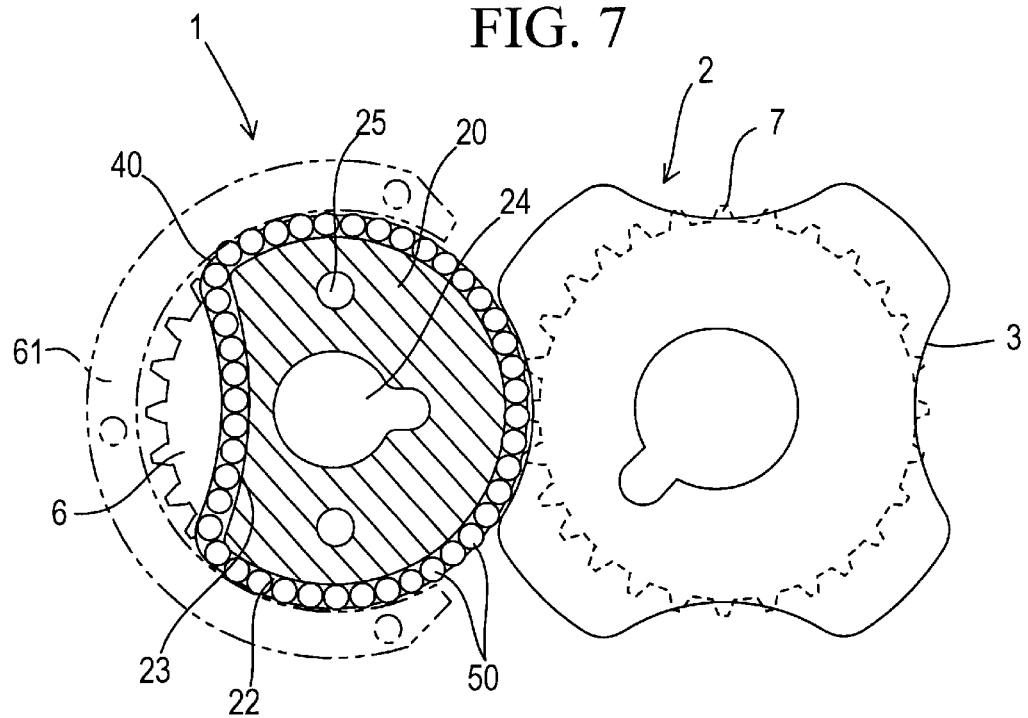
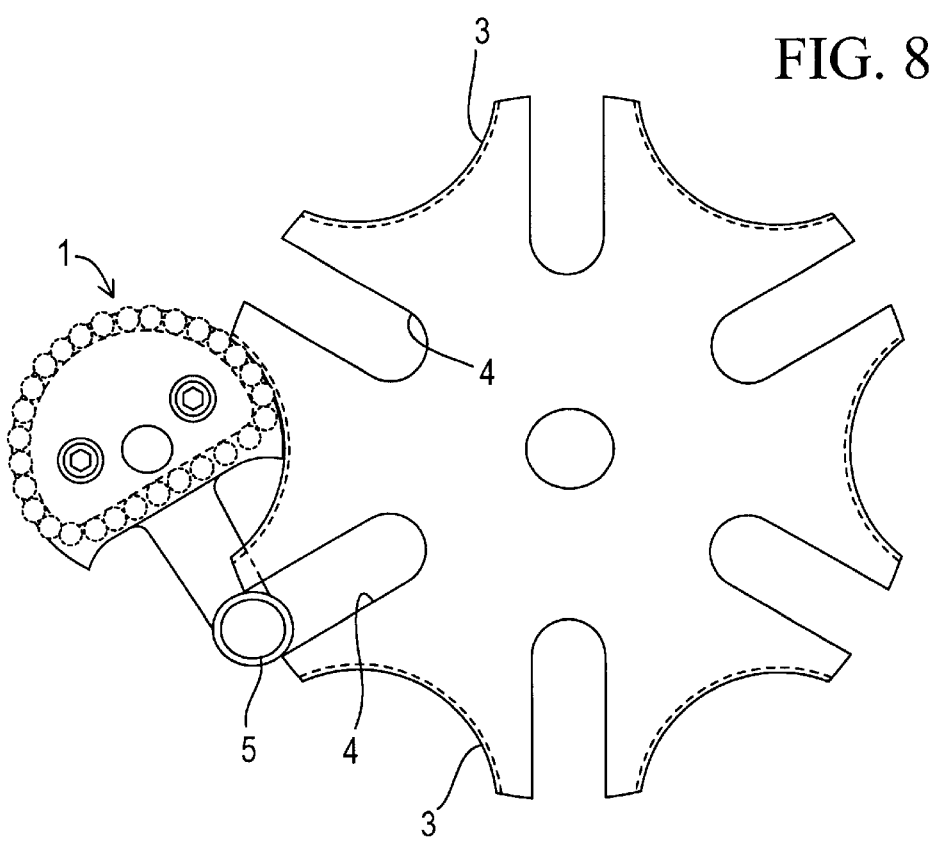

DRIVING CAM OF GENEVA MECHANISM

BACKGROUND OF THE INVENTION

1. Field of the Invention

The present invention relates to a driving cam of a geneva mechanism. As generally known, a geneva mechanism is constructed as follows. While a circular arcuate convex of a driving wheel and a circular arcuate concave of a driven wheel are coupled and sliding, the driven wheel is detained right at the place without rotating, and when a pin on the driving wheel is inserted into one of the slots of the driven wheel and then pulled out, the driven wheel is rotated to a predetermined degree.

It goes without saying that the transfer loss of energy is decreased, because the circular arcuate convex and the circular arcuate concave are sliding smoothly almost without any resistance.

2. Description of the Related Art

In the Japanese Utility Model Patent Laid-open No. 1985-64357, an art has been disclosed that the sliding resistance is reduced by disposing rollers successively in the circular arcuate convex.

In the above mentioned prior art, however, it is difficult to process an arrangement of the pins supporting the rollers in a complete round shape, and there is a defect of rather increasing resistance if an irregularity exists in arrangement of dthe rollers.

As opposed to the above described Publication, in the Japanese Patent No. 2788218, a mechanism holding balls (rotating bodies) inside a annular groove which is formed in a circular arcuate convex of divided wheel(driving rotating body) has been disclosed. However, a detailed structure of holding the balls is that, as shown in FIG. 9, after divided grooves 15A, 15B of having sections of about ¼ of the circular arc are formed in the opposite surfaces of a pair of male and female cam members 11A, 11B, and then a annular groove 15 is formed by coupling a pair of cam members 11A, 11B with bolt 13, the balls 14 are held inside this annular groove 15 so as to be in contact with a circular arcuate concave 3(refer to FIG. 7 of the above described Publication).

However, firstly there are problems that the processing of matching the circular arcs precisely is very difficult when the annular groove 15 is formed by coupling, because the divided grooves 15A, 15B have to be formed individually, and the smooth rotation of the balls 14 can not be expected because the processing error is increasing. Secondly there are many causes to decrease processing accuracy such as of positioning of bolting hole because the divided grooves 11A, 11B are required to be assembled precisely without being displaced to the radial direction, when the male cam member 11A and female cam member 11B are coupled with bolt 13.

SUMMARY OF THE INVENTION

Accordingly, an object of the present invention is to provide a driving cam in which grooves of radial direction, which hold rotating bodies such as balls, can be formed precisely and have a good roundness, and smooth rotation of the rotating bodies can be guaranteed, and which does not affect the precision of the grooves formed in a radial direction when assembled.

To achieve the above object, in the driving cam of the present invention, a peripheral groove is formed concentrically with the driving shaft on a circular arcuate peripheral surface of a lacked circular plate core member, and rotating bodies disposed in the peripheral groove are hold by circular arcuate rims formed at the peripheral edge of covers which are attached to the top and the bottom of the core member.

Preferably, with a path of the rotating bodies being formed along the entire periphery, the rollers are cyclically rotated endlessly. The sectional form of the above described peripheral groove may be triangle, quadrangle, trapezoid, round, oval or the like.

BRIEF DESCRIPTION OF THE DRAWINGS

FIG. 7 is a plan view showing an example of a driving wheel and a driver wheel.

FIG. 8 is a plan view showing another example of a driving wheel and a driver wheel.

DETAILED DESCRIPTION OF THE PREFERRED EMBODIMENT

The embodiment of the present invention will be described with reference to FIG. 1 through FIG. 8.

Figure 1:
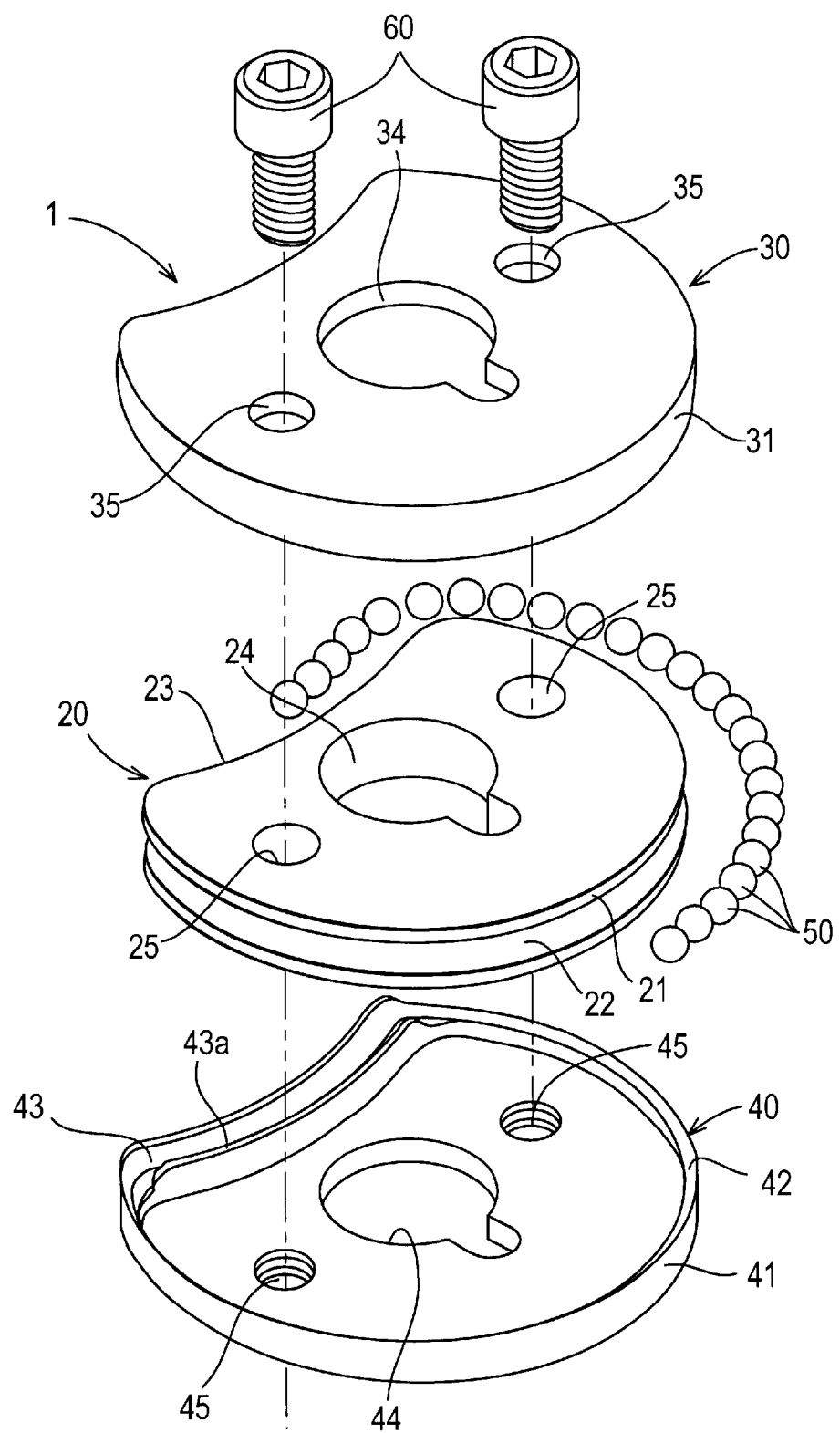
FIG. 1 is an exploded perspective view showing an example of a driving cam of the present invention.
Figure 2:
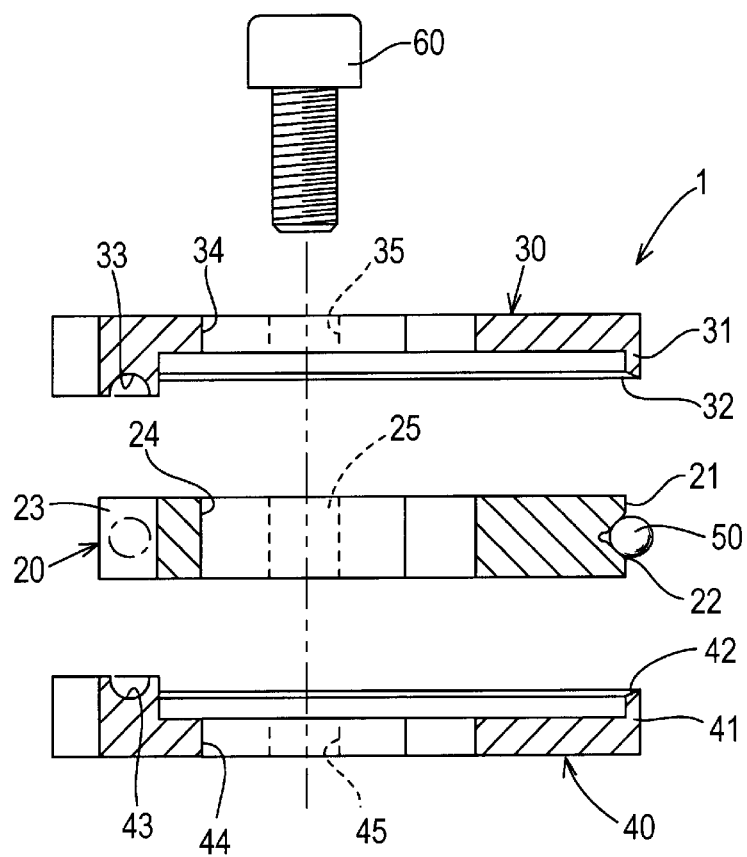
FIG. 2 is an exploded sectional view of FIG. 1.
Figure 3:
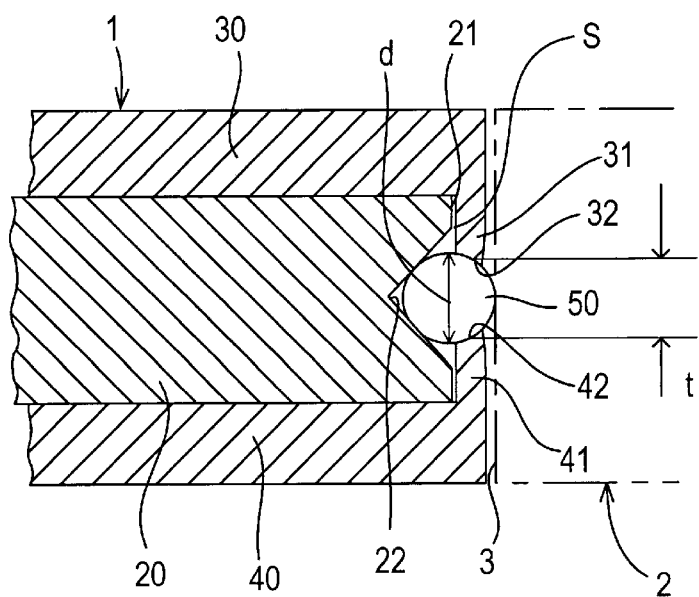
FIG. 3 is a partially enlarged sectional view of a the driving cam of the present invention.
Figure 4:
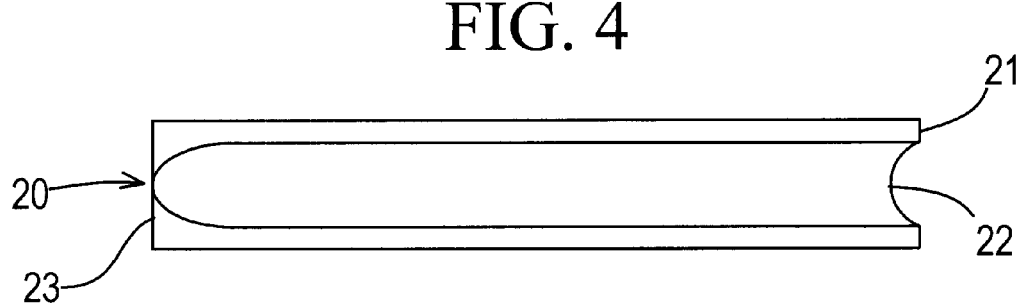
FIG. 4 is a side view showing an example of a core member of a driving cam.
Figure 5:
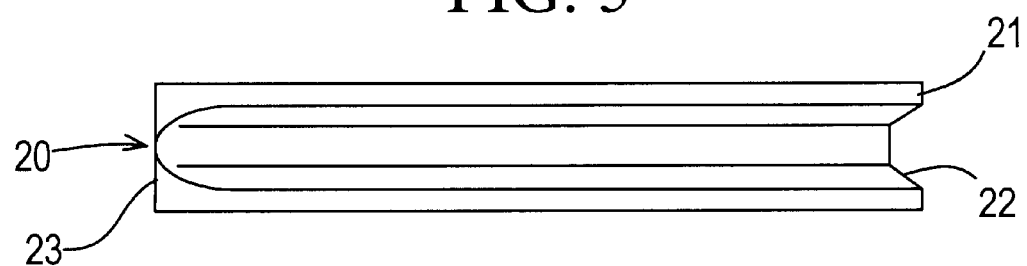
FIG. 5 is a side view showing another example of a core member of a driving cam.

As shown in FIGS. 1, 2 and 3, a driving cam 1 of the present invention consists of a core member 20, a top cover 30, a bottom cover 40, rotating bodies 50 and coupling means 60 such as bolts for assembling the above described core member 20, top cover and bottom cover 30, 40, and rotating bodies 50 integrally.

A coupling hole 24 for inserting the driving shaft is formed in the center of the circular arcuate peripheral surface 21, and through holes 25, 25 are formed on opposite sides of the coupling hole 24. Further, the length of the circular arc of the circular arcuate peripheral surface 21 is set according to that of the circular arcuate peripheral surface of the driven cam to be coupled with the peripheral surface 21.

The core member 20 is a flat plate as a whole, and includes a coupling hole 24 and a groove 22. A driving shaft (not shown) is inserted into the coupling hole 24 for a coupling. The core member 20 also includes a circular arcuate portion, corresponding to a concave portion of a driven cam 2 as shown in FIG. 7, and a concave indentation opposite the circular arcuate portion, which has a vertical flat cross-section as shown in FIGS. 1 and 7. The groove 22 is formed along a circular arcuate peripheral surface 21. The groove 22 can have various cross sectional shapes. The groove 22 of FIGS. 2 and 3 has a triangular cross section, the groove 22 of FIG. 4 has a semicircular or a semi-ellipsoidal cross section, and the groove 22 of FIG. 5 has a trapezoidal cross section.

The bottom cover 40 has the same shape as the top cover 30. When coupled on the driving shaft, the top and bottom covers 30 and 40 contact the upper and lower surface of the core member 20, respectively.

In order to prevent the rotating bodies 50 accommodated in the groove 22 from being removed, the top and bottom covers 30 and 40 have rims 31 and 41, respectively. The rims 31 and 41 are formed at edges of the top and bottom covers 30 and 40 corresponding to the groove 22 and protrude to face each other. The rims 31 and 41 have a gap "t" therebetween when assembled. In the drawings, reference numeral 34 denotes a coupling hole of the top cover 30 for a driving shaft, and reference numeral 35 denotes a through hole for a bolt. Reference numeral 42 denotes a chamfer of the rim 41, and reference numeral 43 denotes a groove of the circular arcuate portion. Reference numeral 44 denotes a coupling hole for the driving shaft, and reference numeral 45 denotes a screw hole for a bolt.

The bottom cover 40 has the same shape as the top cover 30. Reference numeral 41 denotes a rim, 42 a chamfer of the rim 41,43 a rotating body path of circular arcuate section, 43a the inside wall of the rotating body path 43, 44 coupling hole for the driving shaft, and 45 bolt holes for screwing bolts.

To assemble driving cam 1 comprising core member 20, the top cover 30 and bottom cover 40, the core member 20 is mounted on the bottom cover 40 such that the coupling hole 24 and the through holes 25 fit in with the coupling hole 44 and the bolt holes 45. The balls as rotating bodies 50 are then disposed successively in the groove 22 and rotating body path 43, the top cover is then placed, and the bolts 60, 60 are inserted into the through holes 35, 35 and screwed into the bolt holes 45, 45 of the bottom cover 40, completing a fastening.

Here, the top and bottom covers 30 and 40 merely serve to prevent the rotating bodies 50 from being removed from the groove 22 of the core member 20 and to provide a path for circulation and rotation of the rotating bodies 50. The groove 22 of the core member substantially serves as a cam. Therefore, errors that can occur during assembly of the top and bottom covers 30 and 40 may be allowed within a range that does not affect circulation and rotation of the rotating bodies 50.

FIG. 3 is a cross-sectional view illustrating the assembled driving cam. The rotating bodies 50, shown in FIGS. 2 and 3, have a ball shape that can be accommodated in a space, S, formed by the groove 22 and the rims 31 and 41. The gap, t, is smaller than the diameter, d, of the rotating body 50 so that the rotating bodies 50 protrude outwardly through the gap, t. In order to reduce friction between end portions of the rims 31 and 41 and the rotating bodies 50, as shown in FIG. 2, the chamfers 32 and 42 of the rims 31 and 41 are formed to protrude inwardly, each facing the other.

The chamfers 32 and 42 preferably have a circular arcuate form. In this way, the groove 22 regulates the positions of the rotating bodies 50, and the rims 31 and 41 of the covers 30 and 40 prevent the rotating bodies 50 from being removed. Accordingly, if the groove 22 is processed precisely to be concentric with a shaft of the core member 20, the rotating bodies 50 rotate smoothly along the circular arcuate concave portion 3 of the driven cam 2. Of course, it is easy to precisely process the single groove 22 to be concentric with the shaft of the core member 20.

As shown in FIGS. 1 and 2, a plurality of the rotating bodies 50 are further arranged on the peripheral groove 22 of the core member 20, and rotating body paths 33 and 43 are formed in the rest edges of the top and bottom covers 30 and 40. The rims 31 and 41 prevent the rotating bodies 50 from being removed while accommodating rotation of the rotating bodies 50.

Figure 6:
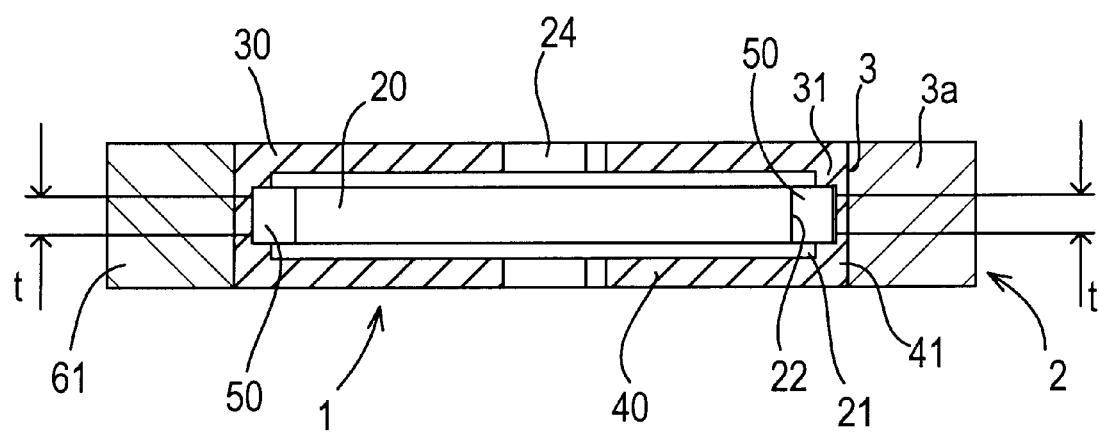
FIG. 6 is a partial sectional view showing another example of a driving cam of the present invention.
Figure 9:
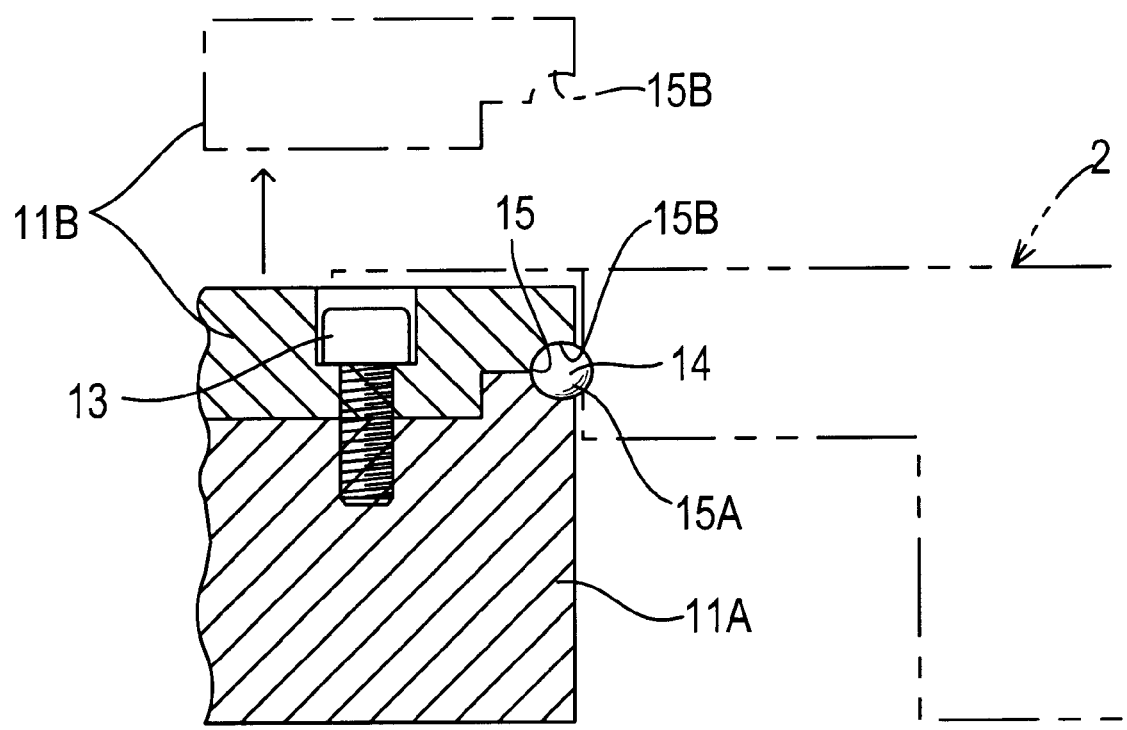
FIG. 9 is a partial sectional view showing conventional driving cam.

The shape of the core member 20 depends on that of the rotating body 50. As shown in FIG. 6, when a roller having a cylindrical shape is used as the rotating body 50, the groove has a rectangular cross-section.

As described above, when the roller having a cylindrical shape is accommodated in the space, S, as the rotating body 50, the roller cannot protrude outwardly through the gap, t. Therefore, a protruding portion 3a is formed in the circular arcuate concave 3 of the driven cam 2 so that the protruding portion 3a is inserted into the gap between the rims 31 and 41 to contact the rotating bodies 50.

The driving wheel having the driving cam 1 and the driven wheel 50 driven by the former may be coupled in various ways. For one, a partial gear 6 is disposed on the peripheral surface 23 of the concave indentation opposite the circular arcuate portion of the core member 20, and a gear 7 is disposed on the driven cam 2 so as to be engaged with a part of gear 6, as shown in FIG. 7 or a geneva gear, as shown FIG. 8, or a star gear (not shown in the drawings) may do just as well. In FIG. 8, the reference numeral 4 denotes slots, and numeral 5 denotes a pin for engaging the slots 4.

Further, an auxiliary guide 61 may be formed facing a part of the peripheral surface of driving cam 1 in order to decrease friction between rotating bodies, and make smooth the movement of the rotating bodies 50 as well, when the rotating bodies 50 disposed in the groove of the driving cam 1 rotate on their own axis and revolve along the groove 2. The auxiliary guide 61 is always formed in the normal state regardless of the rotating movement of the driving cam 1, and is able to be brought, along with the groove 22 of the driving cam 1, into rolling contact with the rotating bodies 50 which are not in contact with the driven cam 2 when the driving cam 1 is rotating in either direction, while supporting a part thereof by contact, resulting in minimizing friction and collision between the rotating bodies 50, thus preventing damage to the rims 31, 41 of the top and bottom covers 30, 40 due to friction and collision force.

That is, the auxiliary guide 61 serves as a sidewheel of a typical bearing and is used to secure a maximum length of the sidewheel required to contact the rotating body 50. Therefore, when the auxiliary guide 61 is installed, the driving cam I can achieve a high-speed rotation.

When the roller is used as the rotating body 50 as shown in FIG. 6, the inner surface of the auxiliary guide 61 can be formed to have a protruding circular arcuate form, and the protruding circular arcuate portion of the auxiliary guide 61 is inserted into the gap between the top and bottom covers 30 and 40 to contact the roller.

The materials of the driving cam 1 may be chosen among steels, ceramics, synthetic resins, or the like. Also, as a fabricating method, besides cutting work, forging, sintering, molding, or the like may be adopted. Further, as a coupling means of each member, besides bolts, press fitting, adhesives, or the like may be used.

As described above, the present invention is constructed such that a groove is formed on a circular arcuate peripheral surface of a core member, and rotating bodies are disposed in the peripheral groove held by a top and a bottom cover which are attached to the top and the bottom of the core member, so that it is easy to form the groove concentric with the shaft of the core member precisely, with the result being that a smooth rotation of the rotating bodies is possible.

In addition, by forming an auxiliary guide facing a part of the peripheral surface, the rotating bodies are brought into rolling contact, while friction and collision between rotating bodies are minimized, thus preventing the damage to the rims of the top and the bottom covers.

What is claimed is:

1. A driving cam of a Geneva mechanism, comprising:
a core member coupled to the driving cam, comprising a circular arcuate portion corresponding to a circular arcuate concave portion of a driven cam, and a groove formed along a peripheral surface of the circular arcuate portion;
a plurality of rotating bodies arranged in the groove;
top and bottom covers including rims formed at a location corresponding to the groove and protruding to face each other, wherein the rims have a gap therebetween preventing the rotating bodies from being removed from the groove when the top and bottom covers are coupled to the driving cam, said covers contacting an upper and lower surface of the core member, respectively; and,
a coupling means for coupling the core member and the top and bottom covers.

2. The cam of claim 1, wherein a plurality of the rotating bodies are further arranged on the peripheral surface of an indentation into the circular core member, wherein the top and bottom covers further include a rotating body path, wherein the rotating body path prevents the rotating body accommodated in the indentation in the core member from being removed from the groove when the top and bottom covers are coupled to the driving cam while allowing circulation of the rotating bodies along the entire peripheral surface of the core member.

3. The cam of claim 2, wherein the indentation into the circular arcuate portion of the core member has a concave shape.

4. The cam of claim 1, wherein the groove has one of a triangular cross-section, a semicircular cross-section, a semi-ellipsoidal cross-section, or a trapezoidal cross-section.

5. The cam of claim 1, further comprising an auxiliary guide for holding the plurality of the rotating bodies arranged on the indentation into the circular core member.

6. The cam of claim 1, wherein the rotating bodies have a ball shape accommodated in a space formed by the groove and the rims of the top and bottom covers and a portion of each of the rotating bodies protruding outwardly through a gap between said rims, wherein the gap is smaller than the diameter of the rotating bodies.

7. The cam of claim 1, wherein the groove has a rectangular cross section, and the rotating bodies are rollers, the rollers accommodated in a space formed by the groove and the rims of the top and bottom covers and contacting the circular arcuate concave surface of the driven cam.

8. The cam of claim 1, wherein the rims include chamfers protruding inwardly to face each other, respectively.

9. The cam of claim 8, wherein the chamfers have a circular arcuate shape.

* * * * *